(12) United States Patent
Kraus et al.

(10) Patent No.: US 10,479,277 B2
(45) Date of Patent: Nov. 19, 2019

(54) REARVIEW MIRROR ASSEMBLY WITH ANTENNA

(71) Applicant: Gentex Corporation, Zeeland, MI (US)

(72) Inventors: Andreas Kraus, Baden-Württemberg (DE); Christopher J. Koleszar, Zeeland, MI (US); Sebastien C. Jaeger, Saugatuck, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/527,455

(22) PCT Filed: Nov. 18, 2015

(86) PCT No.: PCT/US2015/061306
§ 371 (c)(1),
(2) Date: May 17, 2017

(87) PCT Pub. No.: WO2016/081580
PCT Pub. Date: May 26, 2016

(65) Prior Publication Data
US 2017/0355308 A1    Dec. 14, 2017

Related U.S. Application Data

(60) Provisional application No. 62/081,101, filed on Nov. 18, 2014.

(51) Int. Cl.
*B60R 1/04* (2006.01)
*B60R 1/12* (2006.01)
*H01Q 1/32* (2006.01)

(52) U.S. Cl.
CPC ............... *B60R 1/04* (2013.01); *B60R 1/12* (2013.01); *H01Q 1/3208* (2013.01); *B60R 2001/1215* (2013.01); *B60R 2001/1261* (2013.01)

(58) Field of Classification Search
CPC ...... B60R 1/04; B60R 1/12; B60R 2001/1261; B60R 2001/1215
(Continued)

(56) References Cited

U.S. PATENT DOCUMENTS 2,964,746 A * 12/1960 Trudnak, Jr. ............ B60R 1/12
                                                          248/481
5,649,317 A *  7/1997 Suzuki ................... B60R 1/12
                                                          455/345
(Continued)

FOREIGN PATENT DOCUMENTS

EP       0860325 B1   11/2002
EP       2340966 B1   12/2013
(Continued)

OTHER PUBLICATIONS

International Searching Authority, International Search Report and Written Opinion for International Application No. PCT/US2015/061306 dated Feb. 11, 2016, 9 pages.

*Primary Examiner* — Ricky D Shafer
(74) *Attorney, Agent, or Firm* — Price Heneveld LLP; Bradley D. Johnson

(57) ABSTRACT

A rearview mirror assembly includes a main housing defining an exterior surface, an interior, and an open side, the exterior surface having a recess therein. The assembly also includes a control module coupled within the interior of the housing, a mirror coupled over the open end of the housing, and a communication module. The communication module includes an antenna electrically coupled with the control module and an antenna housing at least partially enclosing the antenna and coupled within the recess of the exterior surface of the main housing.

9 Claims, 10 Drawing Sheets

(58) Field of Classification Search
USPC .................................................. 359/871, 872
See application file for complete search history.

(56) References Cited

U.S. PATENT DOCUMENTS

| | | | |
|---|---|---|---|
| 5,798,688 A * | 8/1998 | Schofield | B60R 1/086 340/438 |
| 6,011,518 A * | 1/2000 | Yamagishi | H01Q 1/3266 343/700 MS |
| 6,019,475 A * | 2/2000 | Lynam | B60R 1/0602 359/604 |
| 6,243,024 B1 * | 6/2001 | Yamabuchi | G01S 7/032 340/903 |
| 7,327,226 B2 | 2/2008 | Turnbull et al. | |
| 2002/0126054 A1 * | 9/2002 | Fuerst | B60C 23/0444 343/712 |
| 2003/0031023 A1 * | 2/2003 | Hutzel | B60Q 1/2665 362/494 |
| 2003/0107521 A1 * | 6/2003 | Matsuura | B60R 1/12 343/713 |
| 2004/0121820 A1 * | 6/2004 | Unno | B60R 1/06 455/569.2 |
| 2004/0246607 A1 * | 12/2004 | Watson | B60R 1/12 359/872 |
| 2010/0171830 A1 * | 7/2010 | Lee | B60R 1/12 348/148 |
| 2011/0156893 A1 * | 6/2011 | Hwang | B60R 1/12 340/442 |

FOREIGN PATENT DOCUMENTS

| | | |
|---|---|---|
| JP | 2001099114 A | 4/2001 |
| JP | 2005229232 A | 8/2005 |
| JP | 2006115440 A | 4/2006 |
| JP | 2007537916 A | 12/2007 |
| JP | 2011077792 A | 4/2011 |
| WO | 2005117204 A1 | 12/2005 |
| WO | 2014156228 | 10/2014 |

\* cited by examiner

REARVIEW MIRROR ASSEMBLY WITH ANTENNA

TECHNOLOGICAL FIELD

The present disclosure relates generally to a rearview mirror assembly for a vehicle. In particular, the rearview mirror assembly includes a communication module including an antenna coupled with a housing thereof.

BACKGROUND

Various rearview mirror assemblies have been adapted to implement at least some functionality of a metering system useable in taxis, livery vehicles, and other "for-hire" driven vehicles. Such function may include metering and the corresponding calculation of a total fee due based on, for example, distance driven in light of a predetermined fare and, potentially, including various fees, taxes, and tips. Accordingly, further improvements may be desired to facilitate the payment of such fees using an adapted rearview mirror assembly.

SUMMARY

According to one aspect of the present invention, a rearview mirror assembly includes a main housing defining an exterior surface, an interior, and an open side, the exterior surface having a recess therein. The assembly also includes a control module coupled within the interior of the housing, a mirror coupled over the open end of the housing, and a communication module. The communication module includes an antenna electrically coupled with the control module and an antenna housing at least partially enclosing the antenna and coupled within the recess of the exterior surface of the main housing.

According to another aspect of the present invention, a near-field communication module includes an antenna unit having a substrate defining a perimeter sidewall extending between a first face and a second face. The substrate further defines a plurality of apertures extending between the first face and the second face. The module further includes a housing comprising an elastomeric material. The housing includes a body defining an interior cavity. The substrate of the antenna unit is received within the cavity with the body extending over the first face, the perimeter sidewall, and an edge defined between the perimeter sidewall and the second face. The housing also includes a plurality of mounting posts that extend from the cavity of the body and further through respective ones of the plurality of apertures.

These and other features, advantages, and objects of the present device will be further understood and appreciated by those skilled in the art upon studying the following specification, claims, and appended drawings.

DETAILED DESCRIPTION OF EMBODIMENTS

Figure 1:
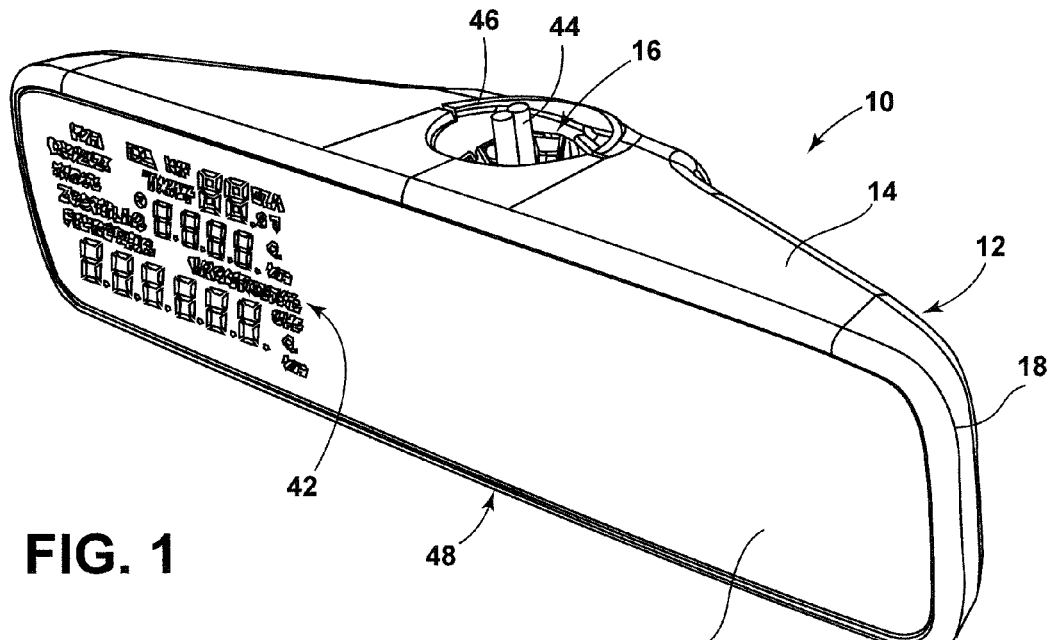
FIG. 1 is a front-top perspective view of a rearview mirror assembly.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
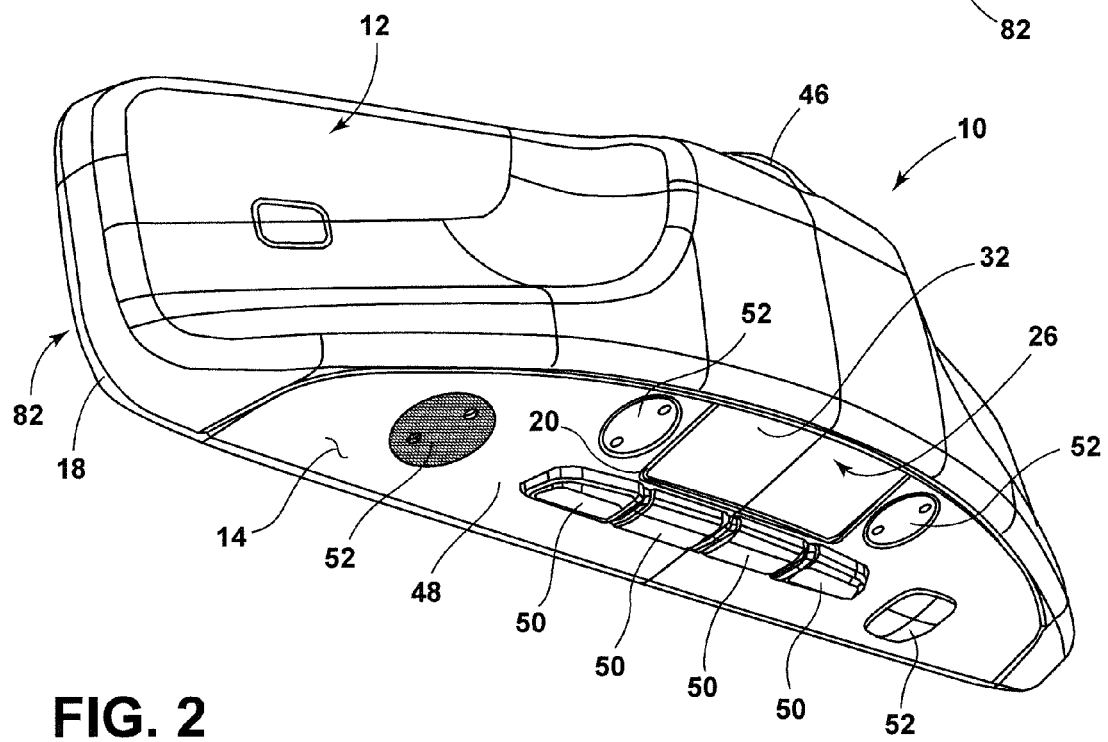
FIG. 2 is a rear-bottom perspective view of the rearview mirror assembly of FIG. 1.
Figure 3:
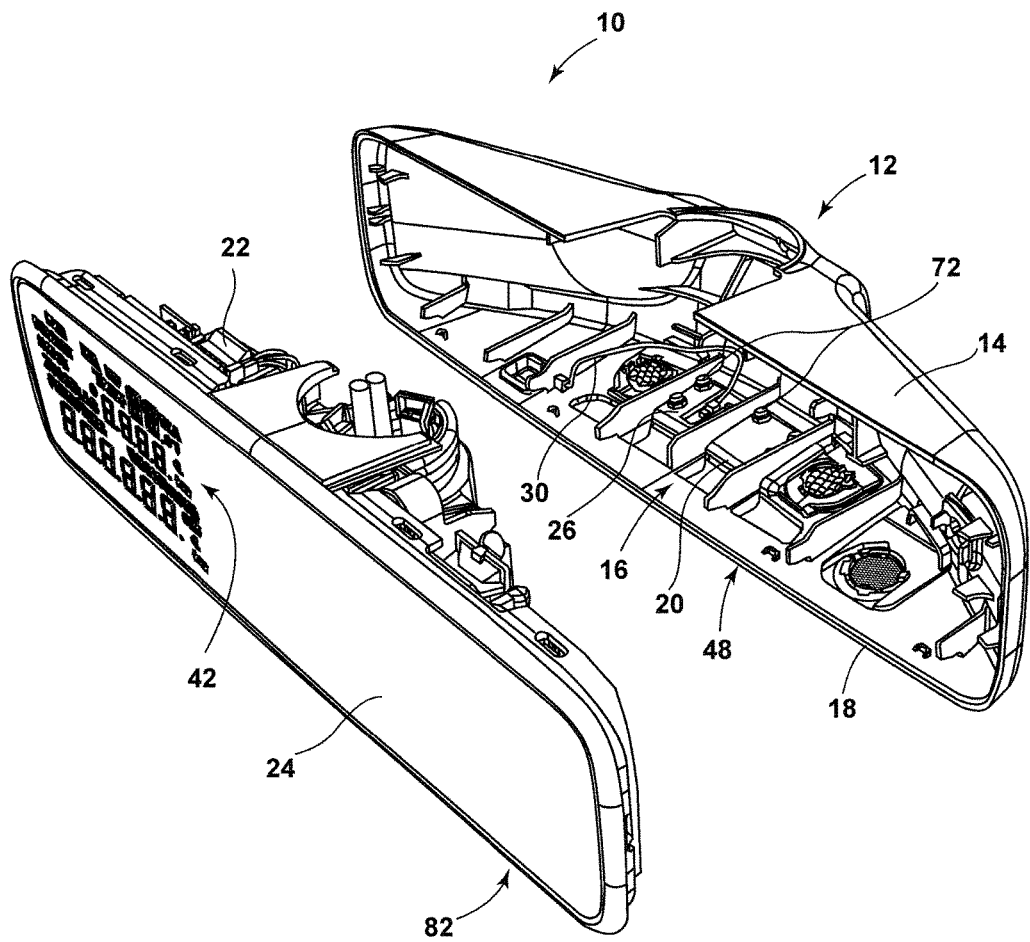
FIG. 3 is an exploded view of the rearview mirror assembly of FIG. 1.

Referring now to FIGS. 1-3, reference numeral 10 generally designates a rearview mirror assembly. Rearview mirror assembly 10 includes a main housing 12 defining an exterior surface 14, an interior 16 (as shown in FIG. 3) and an open side 18 (FIG. 3). Exterior surface 14 defines a recess 20 therein. Assembly 10 further includes a control module 22 (FIG. 3) coupled within the interior 16 of main housing 12 and a mirror 24 coupled over open end 18 of main housing 12. Assembly 10 also includes a communication module 26 having an antenna 28 electrically coupled with control module 22 (such as by wires 30) and an antenna housing 32 at least partially enclosing antenna 28 and coupled within recess 20 of exterior surface 14 of main housing 12.

Figure 4:
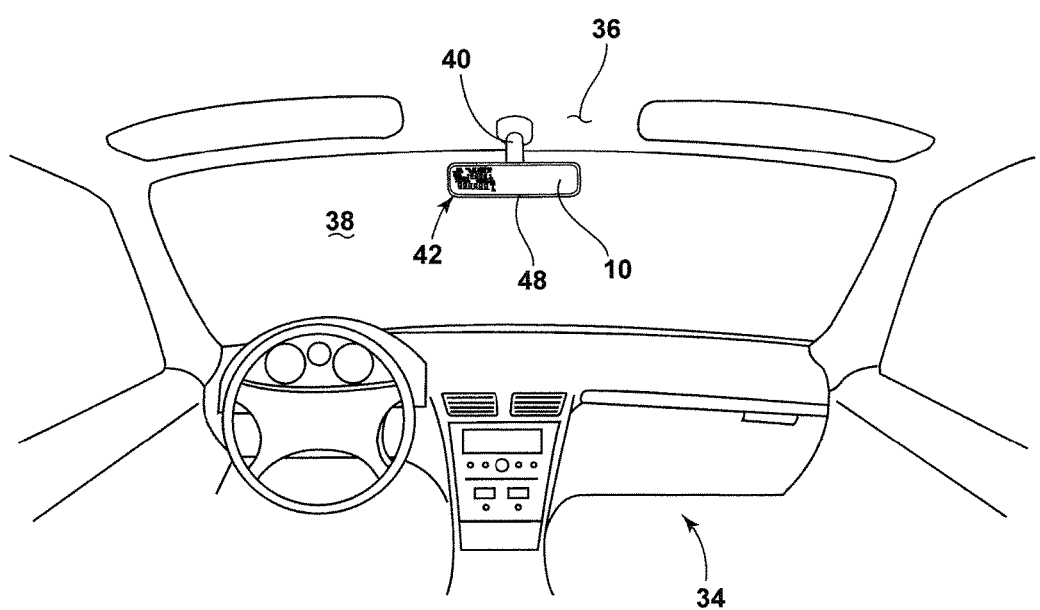
FIG. 4 is a partial view of an interior of a vehicle including the rearview mirror assembly of FIG. 1.

As shown in FIG. 4, rearview mirror assembly 10 can be used in an automobile interior 34 such as by coupling thereof with a headliner 36 in a position adjacent an upper portion of windshield 38 (or by being coupled with windshield 38 itself) by way of a mounting arm 40. In an example, rearview mirror assembly 10 can be in the form of a display mirror assembly, such as by incorporation of a full or partial display 42 into mirror 24. In a further example, rearview mirror assembly 10 can be specifically adapted for use within a taxi or other livery or "for-hire" vehicle. In this respect, display 42 can be configured to present relevant information for such use, including fare information and the like. In such an example, control module 22 can be adapted to receive and/or determine information to be presented on display 42, as well as to control display 42 so as to present such information thereon. In a further embodiment, the control module 22 can further be adapted to calculate or otherwise determine such information, including by determining a distance traveled by the associated vehicle and using such information in a fee or fare calculation model. Control module 22 can receive power, data, or the like by means of cables 44 passing through a mounting aperture 46 in main housing 12, which may further pass through mounting arm 40 to couple with power and/or control systems (not shown) of the vehicle associated with interior 34.

In an embodiment, communication module 26 can facilitate the use of rearview mirror assembly 10 as a stand-alone metering and payment module such that incorporation of rearview mirror assembly 10 alone into vehicle interior 34 can facilitate the use of the associated vehicle as a taxi or other similar vehicle. As such, communication module 26 can house an antenna 28 in the form of a near-field communication ("NFC") antenna that is capable of communicating directly with, or facilitating communication by another component (e.g. control module 22) with, an external device that includes a compatible NFC chip. Such an "NFC enabled" device may include a specifically-adapted cellular or mobile telephone (such as a smart phone or the like), various other electronic devices, or a specifically-adapted credit card. Accordingly, a payment due, as calculated by control module 22 for example, and presented on display 42 can be made by a passenger or the like by positioning an NFC-enabled payment device within a sufficient distance (e.g. about 0.5 cm in to about 30 cm), of antenna 28, whereupon control module 22, as facilitated by communication module 26 and antenna 28, can communicate with the NFC-enabled payment device (not shown) to make such a payment, according to various processes known in the art.

The positioning of antenna 28 of communication module 26 in the location depicted in FIG. 2, including within an antenna housing 32 that is mounted on exterior surface 14 of main housing 12, may help provide for advantageous functioning of communication module 26. This advantageous functioning may include a desired range of communication with an external device, and may further allow for an antenna 28 that is of an appropriate size to fit within an available space on exterior surface 14 of main housing 12. As further shown in FIG. 2, positioning of antenna 28 on the bottom side of exterior surface 14 may provide a convenient location for the positioning of an external device during a payment action due to, for example, the available space under side 48 when positioned within vehicle interior 34 as shown in FIG. 4. As shown in FIG. 2, rearview mirror assembly 10 may include a plurality of buttons 50 and lenses 52 within side 48 of exterior surface 14, which may be related to other functions of rearview mirror assembly 10. The presence of such buttons 50 and lenses 52 can reduce the available space within side 48 of exterior surface 14, thereby making optimization of the function of antenna 28 desirable.

Figure 5:
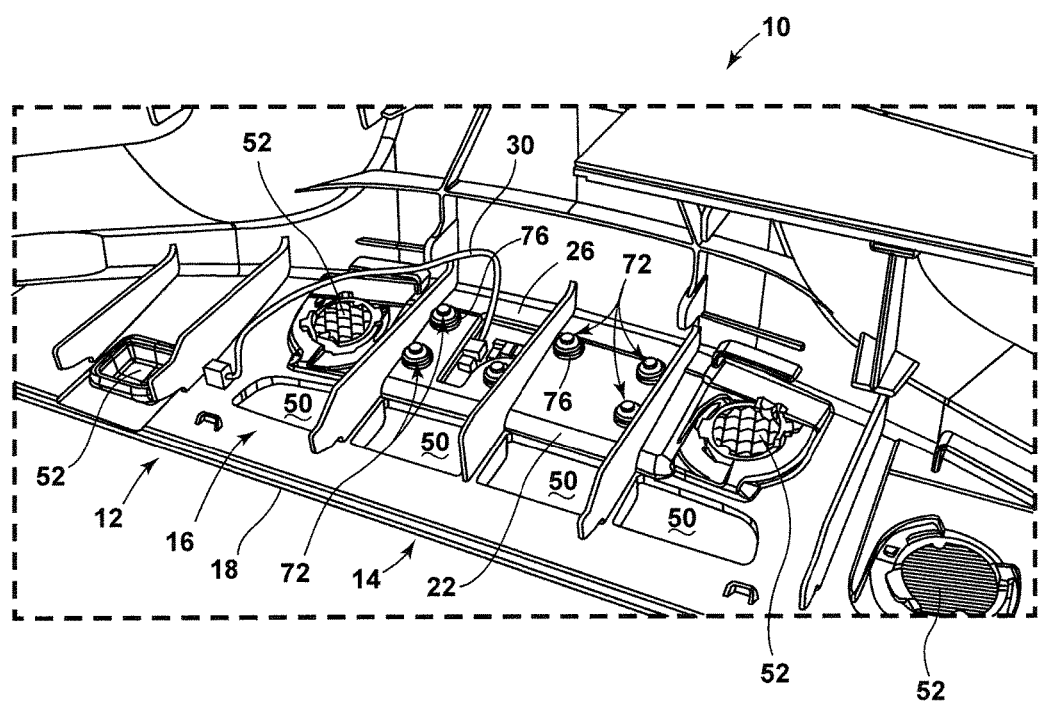
FIG. 5 is a detail view of an interior of the rearview mirror assembly of FIG. 1 showing the coupling of a communication module with a main housing thereof.
Figure 6:
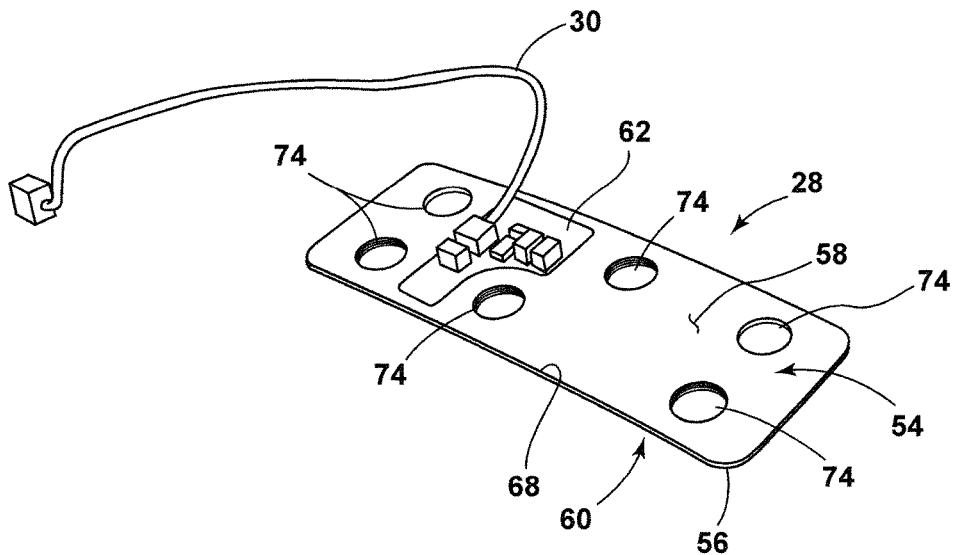
FIG. 6 is front-perspective view of an antenna included in the rearview mirror assembly of FIG. 1.
Figure 7:
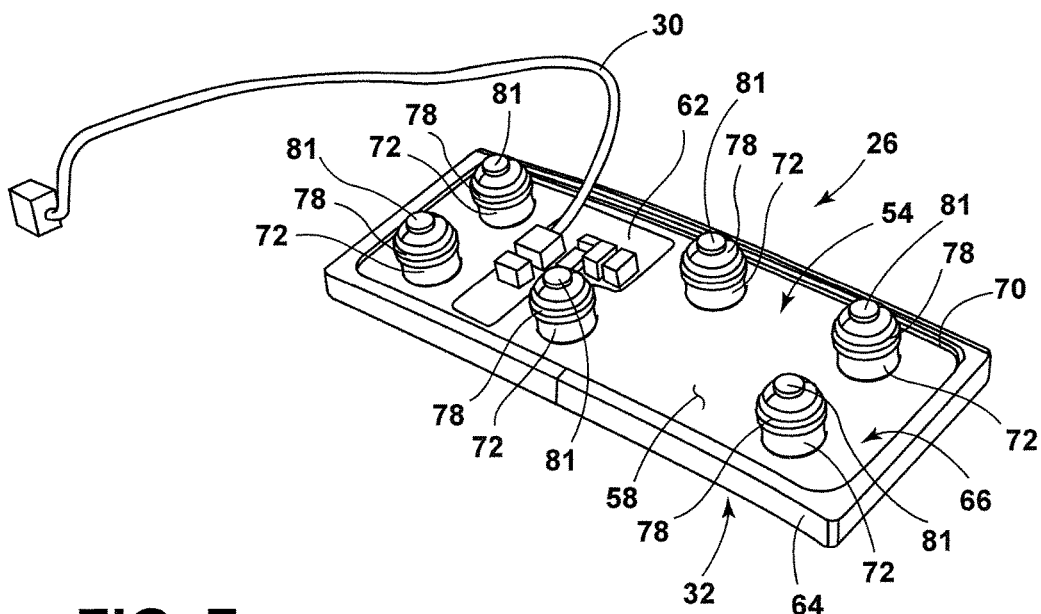
FIG. 7 is a front-perspective view of a communication module including the antenna of FIG. 6 and an antenna housing.

Referring now to FIGS. 5-7, antenna 28 is shown as including an antenna body 54 in the form of a substrate of, for example, metal or other conductive material. As such, antenna body 54 generally defines a perimeter side wall 56 extending between a first face 58 and a second face 60 (either of which can be considered a major surface of antenna body 54). A communication chip 62 can be mounted on the substrate of antenna body 54 with at least portions thereof being electrically coupled with antenna body 54 such that antenna body 54 can receive electrical signals according to an appropriate protocol. Wires 30 can be coupled with chip 62 to facilitate electrical connection between communication module 26 and control module 22. As shown in FIG. 6, antenna housing 32 includes a body 64 defining an interior cavity 66 sized to receive antenna body 54 therein. When antenna body 54 is positioned within interior cavity 66, body 64 of antenna housing 32 extends over so as to cover first face 58 and perimeter side wall 56 of antenna body 54. Further, a lip 70 of a body 64 extends inwardly with respect to interior cavity 66 so as to encapsulate an edge 68 defined between perimeter side wall 56 and second face 60 of antenna body 54. This arrangement helps to secure antenna body 54 within antenna housing 32.

In an embodiment, antenna housing 32 can be integrally made of an elastomer material such as thermoplastic elastomer ("TPE"), silicon rubber, or the like. In an example, antenna housing 32 can be of an elastomer having a hardness durometer of between 60 and 80, Shore A, although other materials of varying durometer hardness levels may be used, such as for the purpose of appearance or the like. The use of an elastomeric material for antenna housing 32 may facilitate a secure coupling of antenna body 54 within interior cavity 66, and may be further advantageous for preventing audible vibration and/or rattling of antenna housing 32 against main housing 12 when the two are coupled together.

As further shown in FIG. 6, antenna body 54 may sit within interior cavity 66 such that second face 60 is positioned within interior cavity 66. In the example shown in FIG. 7, this is achieved by configuring cavity 66 with a depth greater than the thickness of antenna body 54 (i.e. the distance between first face 58 and second face 60.) Such an arrangement may help maintain antenna body 54 in a position away from main housing 12, such as away from a portion of exterior surface 14 comprising a mounting area for antenna housing 32 to prevent rattling or other interference therebetween. In the example shown, for example in FIG. 2, the mounting area can be within and generally defined by or the same as recess 20. In other examples, the mounting area may be a portion of a generally flat exterior surface 14 of adequate size for antenna housing 32 to be mounted along such portion in a manner similar to the examples shown including a recess 20. As further shown in FIG. 7, antenna housing 32 can include a plurality of retaining features in the form of mounting posts 72 extending from body 64 within interior cavity 66 and outwardly therefrom. Further, as shown in FIG. 5, antenna body 54 can include a plurality of apertures 74 that are positioned to generally align with mounting posts 72 so that when antenna body 54 is received within interior 66, mounting posts 72 extend through apertures 74 to a position opposite antenna body 54 from the portions of antenna housing 32 from which they extend.

As shown in FIG. 7, communication module 26 can be assembled with main housing 12 by engagement of mounting posts 72 within a corresponding plurality of apertures of 76 within main housing 12. As shown in FIG. 7, apertures 76 can extend through main housing 12 within the area of recess 20, which is shown in FIG. 7 as extending into interior 16 of main housing 12. Accordingly, mounting posts 72 can be configured as generally cylindrical forms with enlarged portions 78 that can be compressed so as to be press-fit through apertures 76 but are of sufficient size so as to retain mounting posts 72 in an engaged relationship with apertures 76, thereby retaining antenna housing 32 in a coupled relationship with main housing 12. As such the mounting posts 72 can have respective heights that are greater than the depth of the cavity 66 to space apart the enlarged portions 78 from the rest of antenna housing 32 and from antenna body 54. The use of an elastomeric material, as discussed above, for antenna housing 32 (which may be integrally molded of a single piece of elastomeric material) can facilitate such engagement and retention of tabs 72 with apertures 76 and can allow retention tabs 72 to be put under tension when assembled with apertures 76 such that antenna housing 32 is maintained in contact with the mounting area (e.g. within recess 20).

Figure 8:
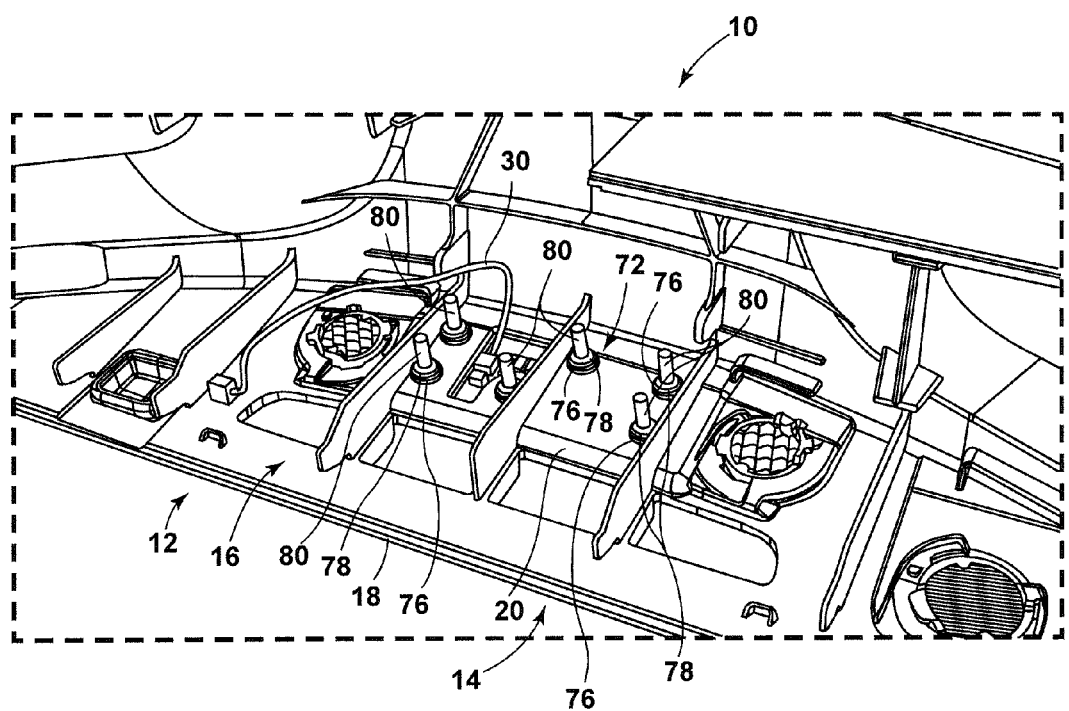
FIG. 8 is a detail view of the interior of the rearview mirror assembly of FIG. 1 during a step in assembly of the communication module with the main housing.

Further, as shown in FIG. 8, mounting posts 72 can be formed in an initial state with a corresponding plurality of pull tabs 80 extending therefrom. Pull tabs 80 may be present to facilitate assembly of antenna housing 32 with main housing 12 by providing material that may be grasped by an installer or by an instrument to pull mounting posts 72 through the corresponding apertures 76 in main housing 12. After installation as such, pull tabs 80 can be removed from mounting posts 72, such as by cutting or the like, which may leave corresponding portions 81 present on mounting posts 72.

Returning to FIG. 3, the above-described mirror 24 (including display 42) and control module 22 can be coupled together in an assembly 82 such that communication module 26 can be initially assembled with main housing 12 from within interior 60, as accessed through open side 18 of main housing 12. Subsequently, wire 30 can be appropriately coupled with control module 22 prior to coupling of assembly 82 with main housing 12. After such connection, assembly 82 can be coupled with main housing 12, such as by a snap-fit arrangement, adhesive, or other fasteners. The entire resulting rearview mirror assembly 10 can then be assembled into a vehicle interior 34, as discussed above.

In the various embodiments discussed herein, communication module 26 may be of a thickness approximately equal to the depth of recess 20 within exterior surface 14 of main housing 12, such that communication module 26 is generally flush with respect to the adjacent areas of exterior surface 14. In other examples, body 64 of antenna housing 32 may be somewhat thicker than the corresponding depth of recess 20 such that communication module 26 extends slightly beyond exterior surface 14 (e.g. between 0.5 and 3 mm) in still further examples, communication module 26 may be assembled on a generally planar exterior surface 14 such that no recess is present therein (at least within the area or assembly of communication module 26 thereto) such that communication module 26 extends away from exterior surface 14 by a distance generally equal to the thickness of body 64 of antenna housing 32.

Figure 9:
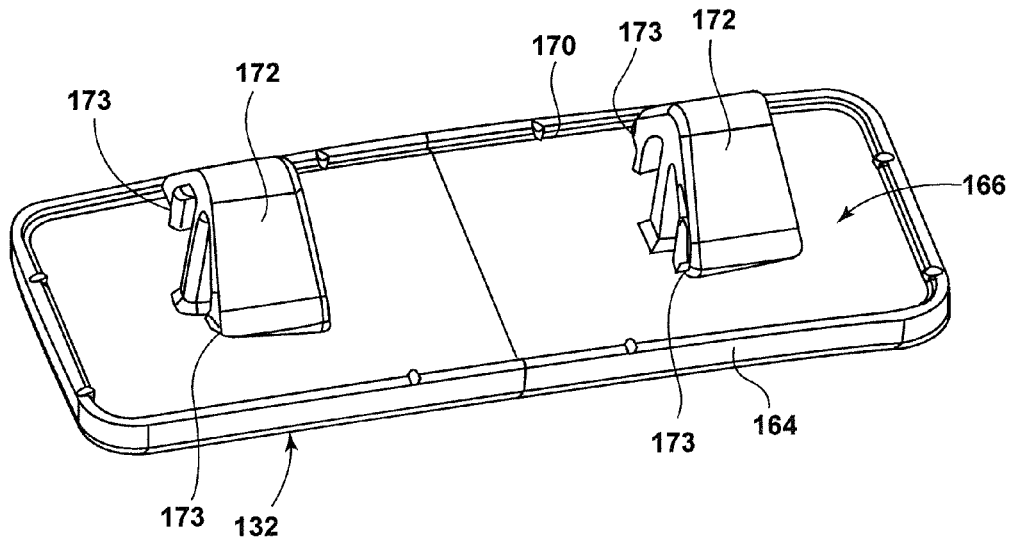
FIG. 9 is a front-perspective view of an alternative antenna housing useable in a variation of a rearview mirror assembly.
Figure 10:
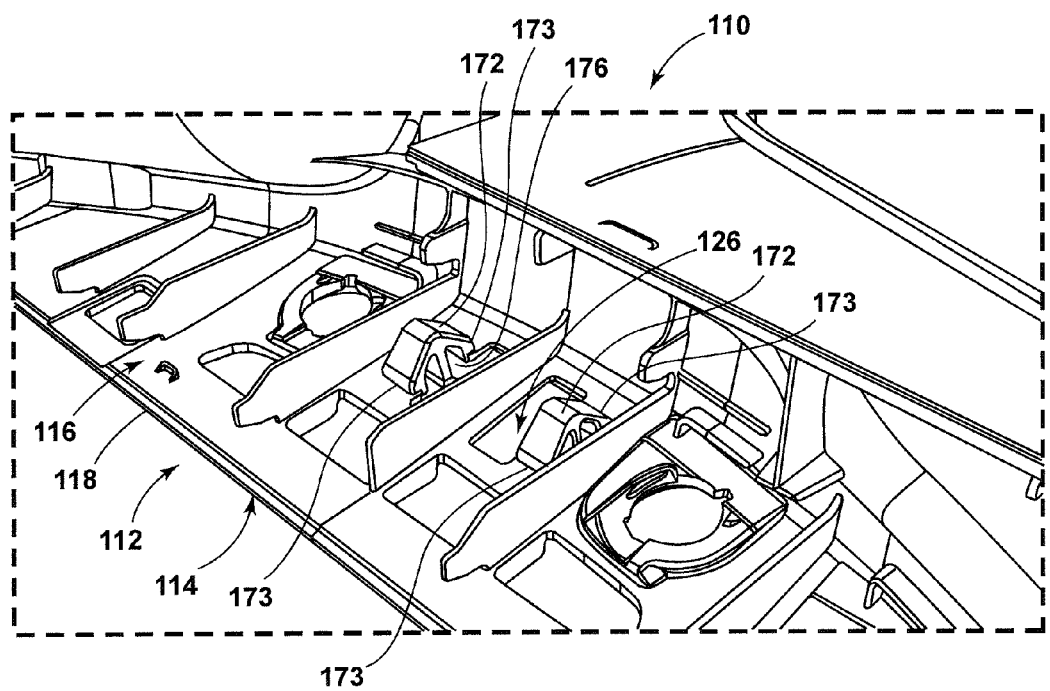
FIG. 10 is a detail view of an interior of a rearview mirror assembly showing the coupling of a communication module, including the antenna housing of FIG. 10, with a main housing.
Figure 11:
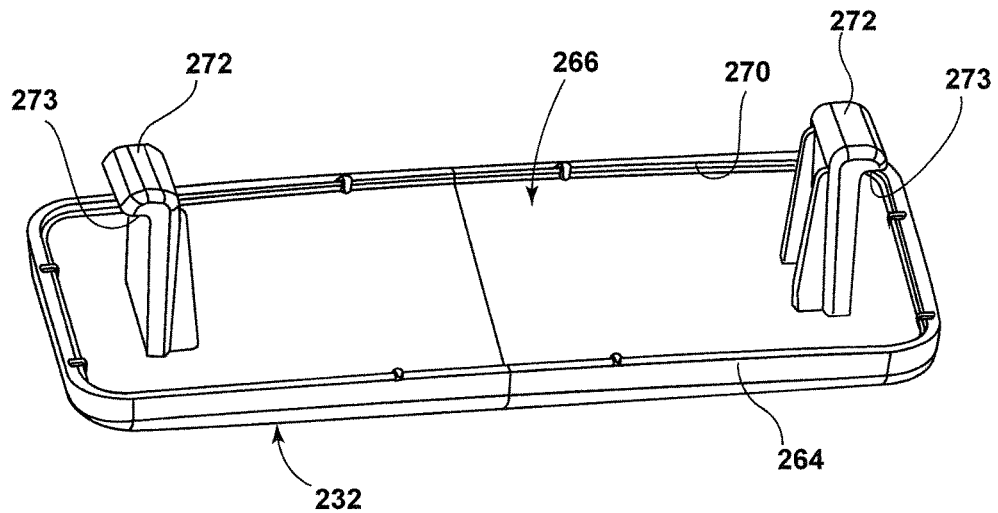
FIG. 11 is a front-perspective view of an alternative antenna housing useable in a variation of a rearview mirror assembly.
Figure 12:
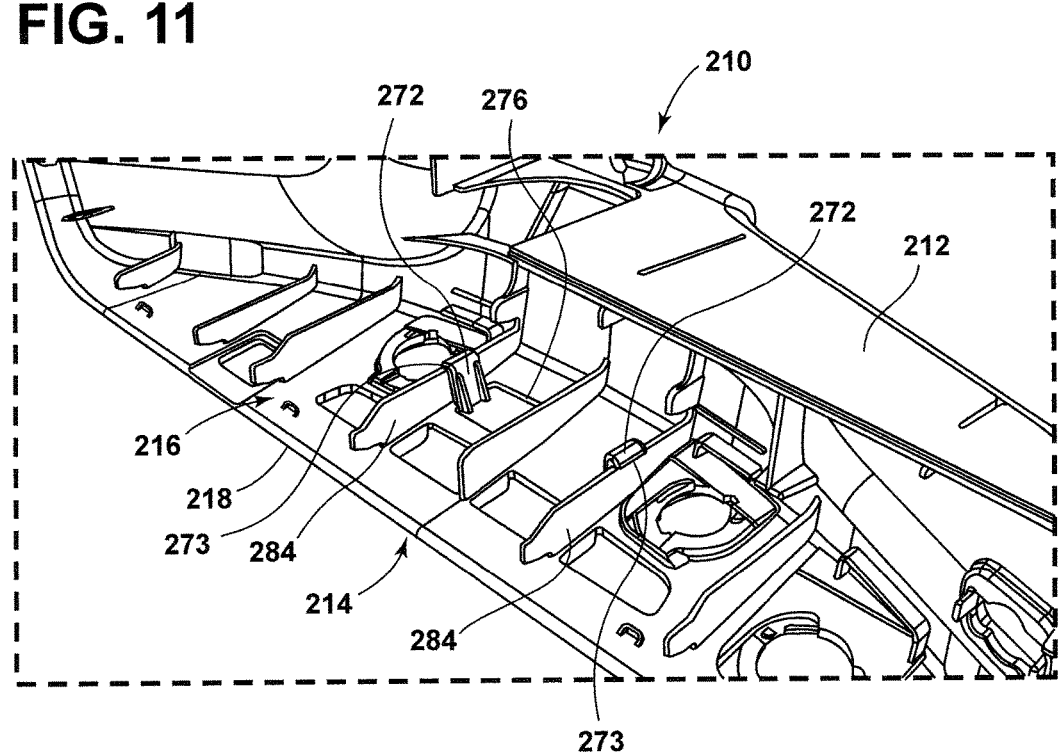
FIG. 12 is a detail view of an interior of a rearview mirror assembly showing the coupling of a communication module, including the antenna housing of FIG. 11, with a main housing.
Figure 13:
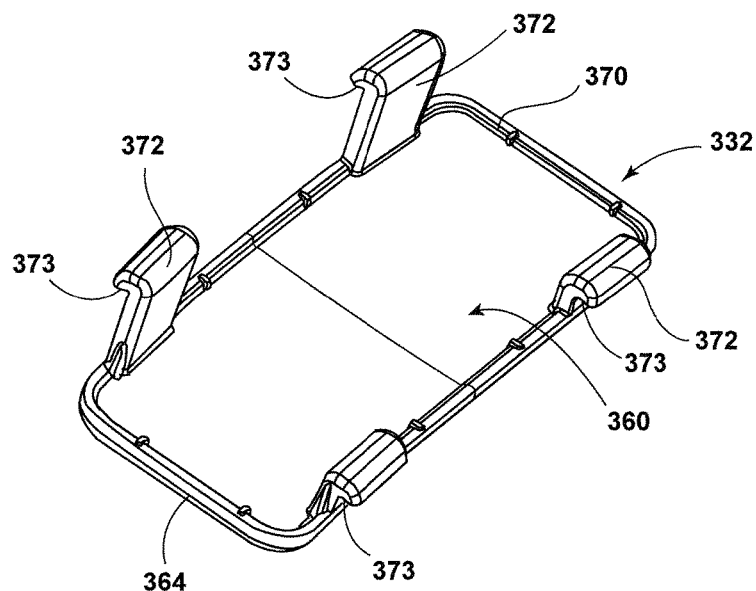
FIG. 13 is a front-perspective view of an alternative antenna housing useable in a variation of a rearview mirror assembly.
Figure 14:
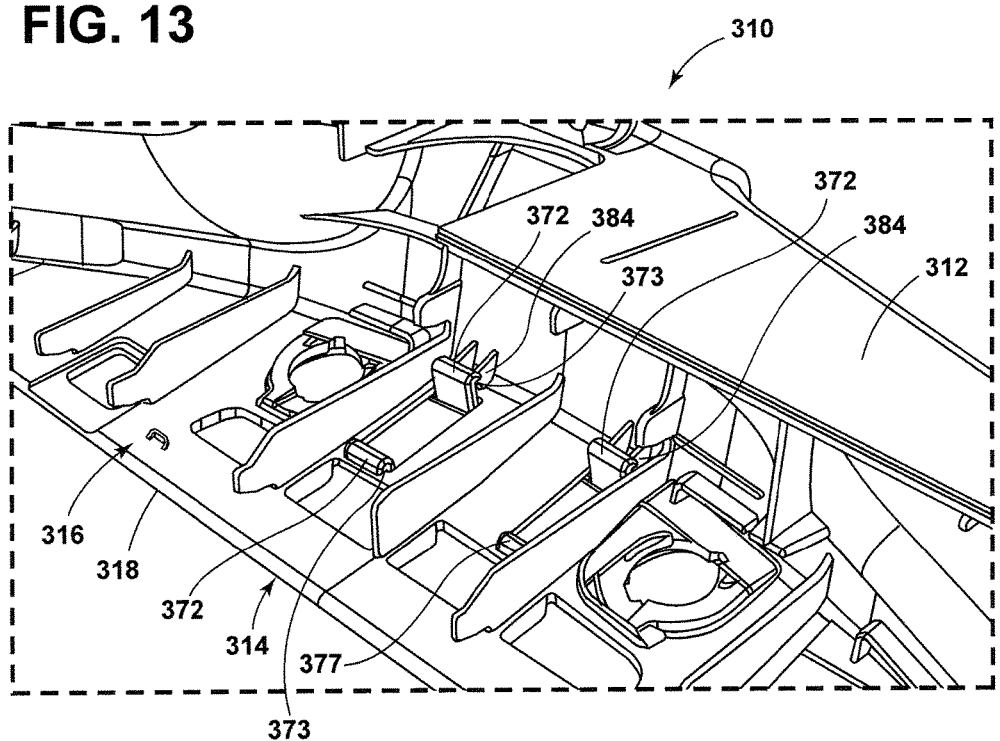
FIG. 14 is a detail view of an interior of a rearview mirror assembly showing the coupling of a communication module, including the antenna housing of FIG. 13, with a main housing.

Referring to FIGS. 9 and 10, a further embodiment of a rearview mirror assembly 110 can include an antenna housing 132 of a plastic material, which may be more rigid than the elastomeric material used in an example of antenna housing 32, described above. In such an example, antenna housing 132 may include a plurality of resiliently flexible mounting tabs 172 extending from body 164 within an interior cavity 166 thereof to one or more engagement ends 173. A corresponding antenna body (which is generally similar to antenna body 54, discussed above, other features not specifically discussed herein also being similar to other features with reference numbers having the same final two digits) may include apertures (similar to apertures 74, discussed above, but repositioned appropriately) to allow mounting tabs 172 to pass therethrough and into a snap-fit arrangement therewith. As shown in FIG. 10, main housing 112 can include corresponding apertures 176 configured to allow mounting tabs 172 to deflect inwardly to pass therethrough and to resiliently snap back into an extended position to engage with main housing 112, thereby retaining communication module 126 with main housing 12. FIGS. 11 and 12 as well as FIGS. 13 and 14, show similar arrangements with respective mounting tabs 172 and 372 extending from respective antenna housings 232 and 332 to engagement ends 273 and 373 that appropriately engage with corresponding main housings 212 and 312 in varying locations and with varying features thereof. As shown in FIGS. 12 and 14, such features may include ribs 284 and 384, which are present within main housing 212 and 312 to give structural support therefor.

Figure 15:
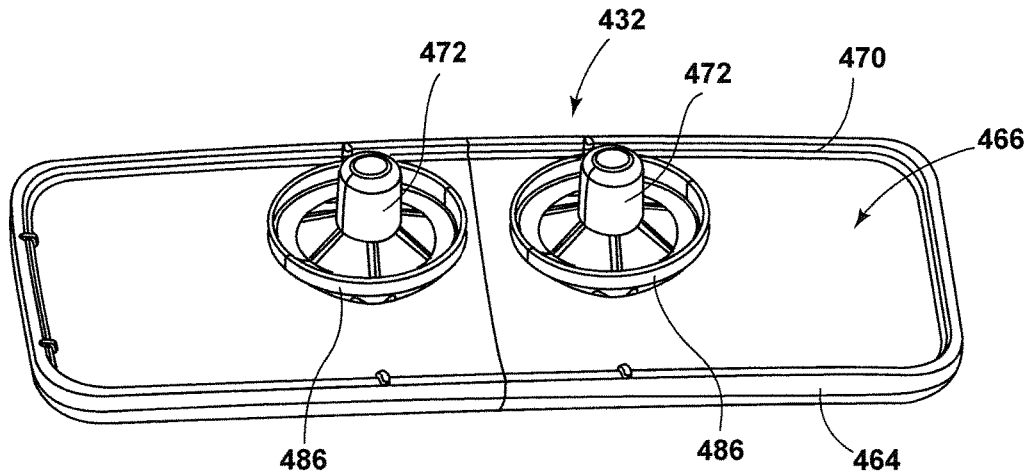
FIG. 15 is a front-perspective view of an alternative antenna housing useable in a variation of a rearview mirror assembly.
Figure 16:
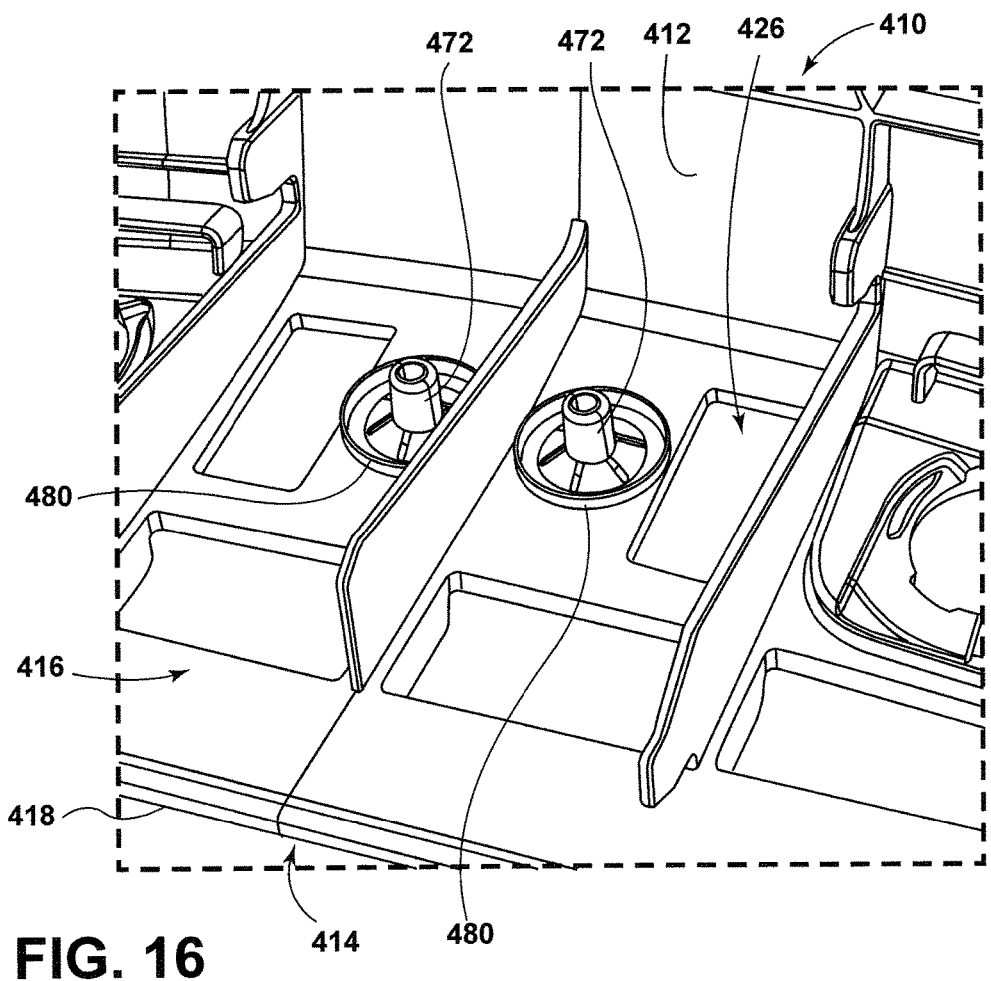
FIG. 16 is a detail view of an interior of a rearview mirror assembly showing the coupling of a communication module, including the antenna housing of FIG. 15, with a main housing.

As shown in FIGS. 15 and 16 a further embodiment of antenna housing 432 may include a plurality of posts 472 extending from within interior cavity 466 of body 464 of antenna housing 432. Posts 472 may be positionable within corresponding holes (not shown, similar to apertures 76 shown in FIG. 7) with control module 22 appropriately positioned against exterior surface 414 of main housing 412. A corresponding plurality of spring fasteners 486 can be slid into engagement with posts 472 to engage therewith, thereby coupling communication module 426 with main housing 412. In an example, spring fasteners 486 can be made of a relatively thin, resilient metal material that forms a press fit with posts 472, which may be of plastic or the like. In such an arrangement, spring fasteners 486 may at least partially dig into posts 472 to secure the relative positioning therewith.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A rearview assembly, comprising:
a housing defining a bottom side exterior surface, an interior, and an open side, the bottom side exterior surface extending from adjacent the open side and having a mounting area thereon, wherein the housing includes a plurality of apertures extending from the bottom side exterior surface to the interior;
a control module coupled within the interior of the housing;
at least one of a mirror and a display coupled with the open side of the housing;
a communication module including:
an antenna electrically coupled with the control module; and
an antenna housing partially enclosing the antenna and coupled with the housing along the mounting area of the bottom side exterior surface, wherein the antenna housing includes a plurality of retaining features coupled therewith and engaging with respective housing apertures.

2. The rearview assembly of claim 1, wherein:
the bottom side exterior surface of the housing defines a recess, the mounting area being positioned within the recess; and
the antenna housing is coupled within the mounting area so as to be at least partially within the recess.

3. The rearview assembly of claim 1, wherein:
the antenna comprises a substrate defining a major surface and having a thickness; and
the antenna housing has a first side overlying the major surface of the antenna and having a body extending from the first side, contacting the mounting area of the housing, and defining a cavity therein within which the antenna body is partially enclosed, the cavity having a depth greater than the thickness of the substrate and being open on a side thereof opposite the major surface, such that the antenna is enclosed between the antenna housing and the mounting area.

4. The rearview mirror assembly of claim 1, wherein:
the antenna housing comprises an elastomeric material; and
the retaining features are generally cylindrical posts with enlarged portions that engage with the apertures within the interior of the housing with the posts under tension, the retaining features being integral with the antenna housing.

5. The rearview assembly of claim 4, wherein:
the antenna defines a plurality of holes aligned with the apertures of the housing; and
the cylindrical posts pass through the holes in the antenna.

6. The rearview assembly of claim 1, wherein:
the antenna housing comprises a plastic material; and
the retaining features are flexible tabs in a snap fit with a feature of the interior of the housing.

7. The rearview assembly of claim 6, wherein the feature of the interior of the housing is one of an edge of the aperture or a structural rib of the housing.

8. The rearview mirror assembly of claim 1,
further including a plurality of spring tabs engaged between respective ones of the plurality of retaining features and portions of the housing adjacent the housing apertures.

9. The rearview mirror assembly of claim 1, wherein:
the antenna defines a perimeter side wall extending along a thickness thereof away from a major surface and includes a plurality of antenna apertures spaced inside the perimeter side wall and aligned with the plurality of housing apertures;
and
the plurality of retaining features coupled with the antenna housing pass through respective ones of the antenna apertures to engage with respective ones of the housing apertures.

* * * * *